United States Patent [19]
Yutaka et al.

[11] Patent Number: 5,664,163
[45] Date of Patent: Sep. 2, 1997

[54] IMAGE GENERATING METHOD AND APPARATUS

[75] Inventors: Teiji Yutaka, Kanagawa; Masakazu Suzuoki, Tokyo; Makoto Furuhashi; Masayoshi Tanaka, both of Kanagawa, all of Japan

[73] Assignee: Sony Corporation, Tokyo, Japan

[21] Appl. No.: 417,126

[22] Filed: Apr. 5, 1995

[30] Foreign Application Priority Data

Apr. 7, 1994 [JP] Japan ................... 6-093739

[51] Int. Cl.$^6$ ...................... G06F 15/00
[52] U.S. Cl. ............. 345/522; 345/526; 345/501
[58] Field of Search .................... 395/162, 161, 395/163, 846, 501, 502, 503, 504, 522, 526; 381/51

[56] References Cited

U.S. PATENT DOCUMENTS

| | | | |
|---|---|---|---|
| 4,703,505 | 10/1987 | Seiler et al. | 381/51 |
| 4,769,640 | 9/1988 | Sato | 364/521 |
| 4,959,803 | 9/1990 | Kiyohara et al. | 340/799 |
| 5,239,626 | 8/1993 | Egami | 395/164 |
| 5,315,698 | 5/1994 | Case et al. | 395/162 |
| 5,537,224 | 7/1996 | Suzuoki et al. | 358/452 |

FOREIGN PATENT DOCUMENTS

| | | |
|---|---|---|
| 0 410 778 | 1/1991 | European Pat. Off. . |
| 0 553 531 | 8/1993 | European Pat. Off. . |
| 632407 | 1/1994 | European Pat. Off. ......... G06T 1/60 |
| 649118 | 10/1994 | European Pat. Off. ....... G06T 15/10 |
| WO8901664 | 2/1989 | WIPO . |

Primary Examiner—Kee M. Tung
Assistant Examiner—Cao Nguyen
Attorney, Agent, or Firm—William S. Frommer; Alvin Sinderbrand

[57] ABSTRACT

Drawing instructions and control instructions generated by a CPU are transferred to a drawing device sections, which generates an image by sequentially performing drawing operations in accordance with the drawing instructions and the control instructions. Each of the drawing instructions and the control instructions has a data structure consisting of a header portion and an instruction data portion. The header portion has a command identification code for indicating of what kind the instruction is. A drawing instruction sequence is formed in which the drawing instructions and the control instructions are arranged in the order of drawing and control procedures, and DMA-transferred to the drawing device section by a sorting controller. The drawing device section performs drawing and control operations in the order in the drawing instruction sequence.

9 Claims, 12 Drawing Sheets

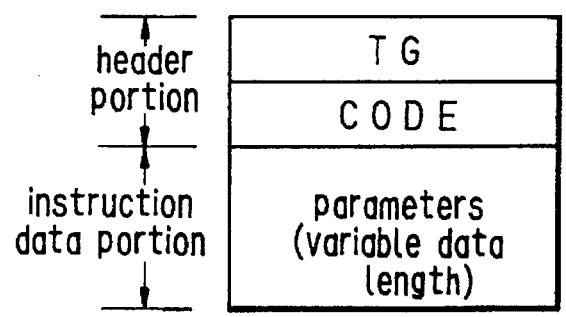

FIG.8
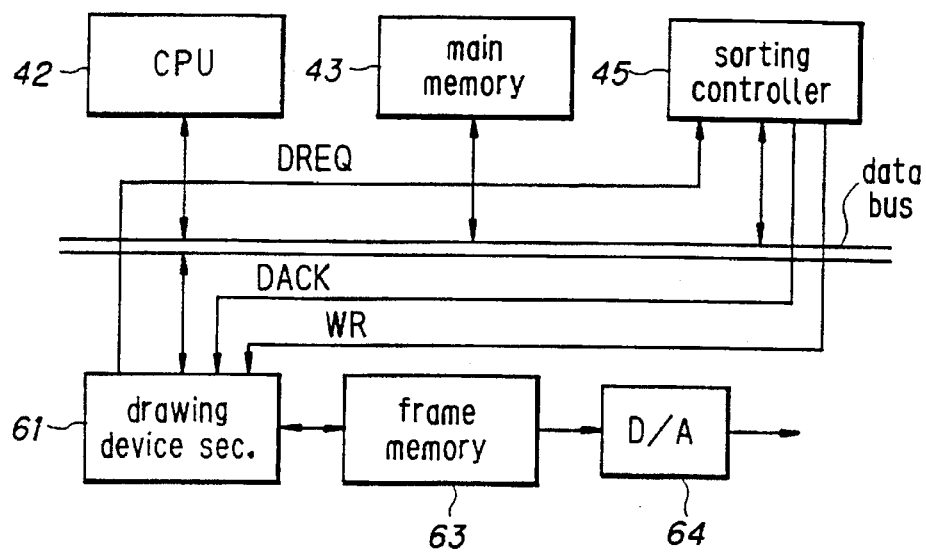
FIG.9A (DREQ)
FIG.9B (DACK)
FIG.9C (WR)
FIG.9D (DATA)
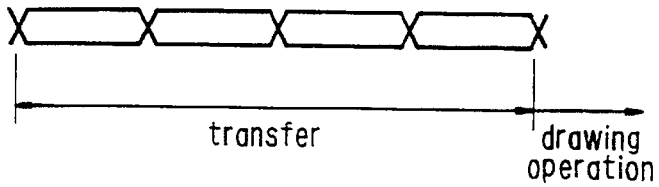
FIG.10
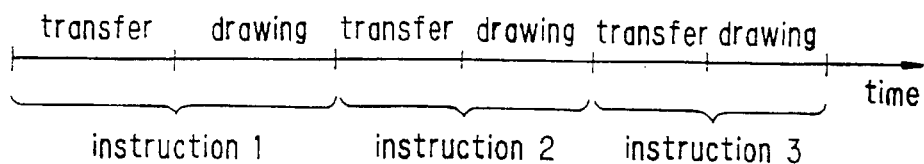

FIG.12A
execution packet buffer
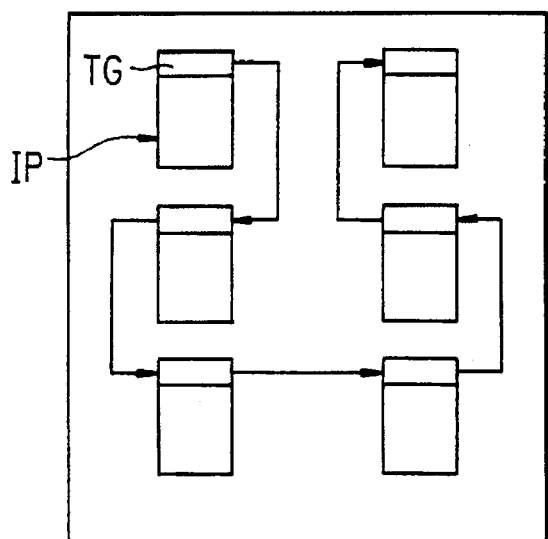
FIG.12B
setting packet buffer
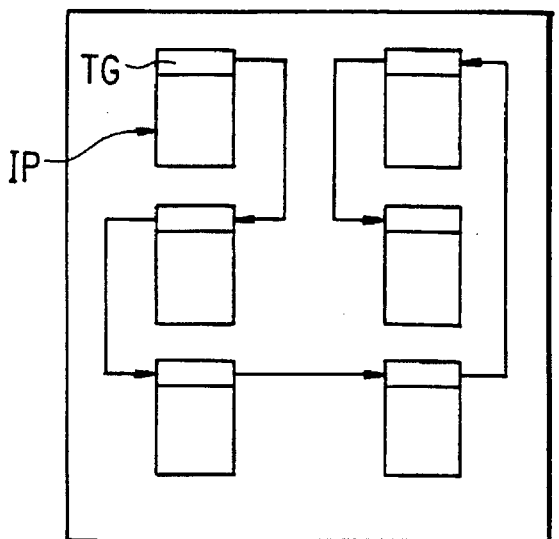
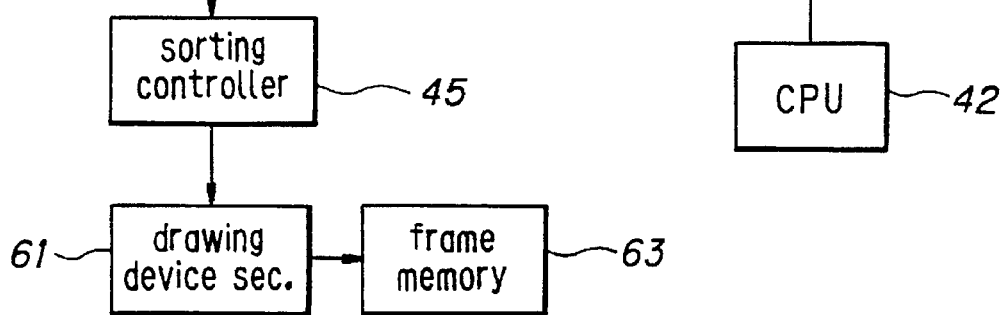
FIG. 13
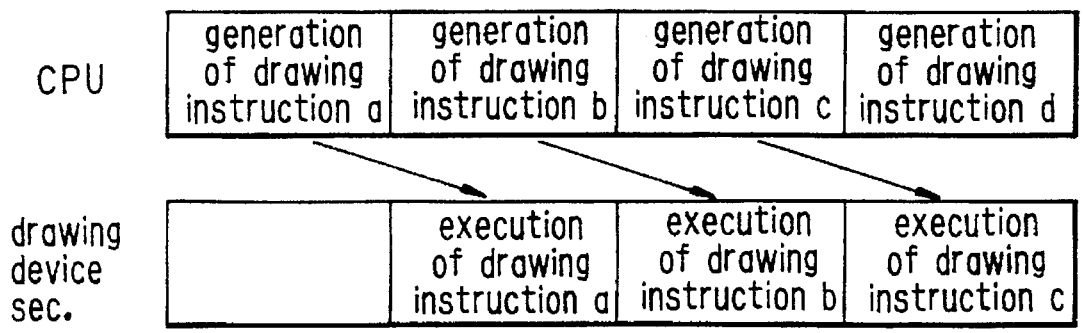

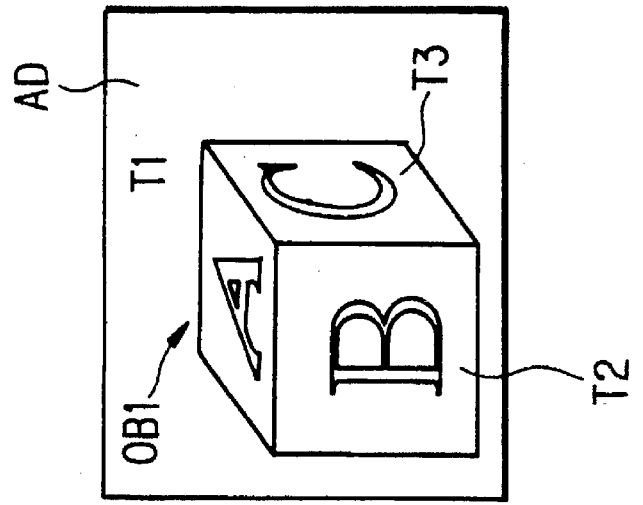
FIG.14C
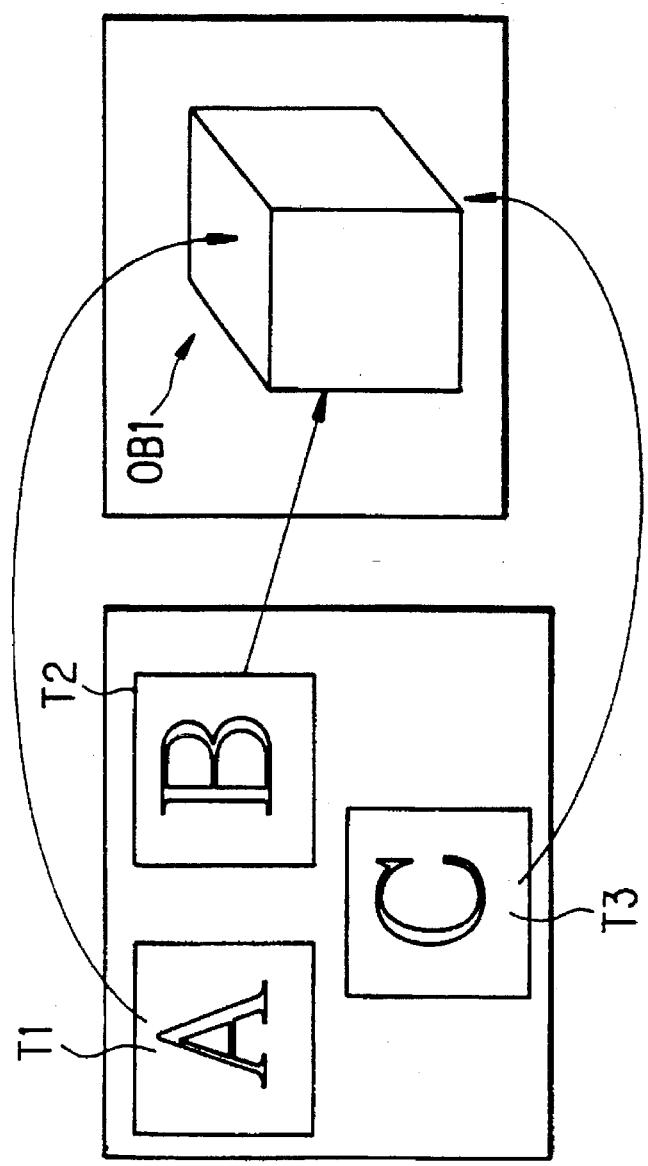
FIG.14B
FIG.14A first transfer command

FIG.19A (PRIOR ART)
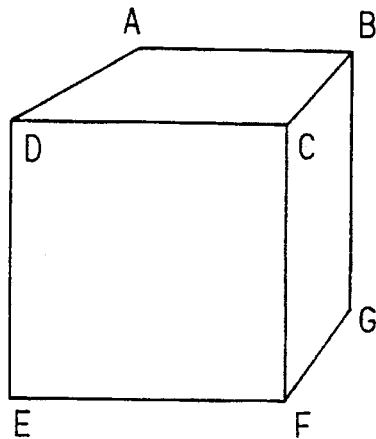
FIG.19B (PRIOR ART)
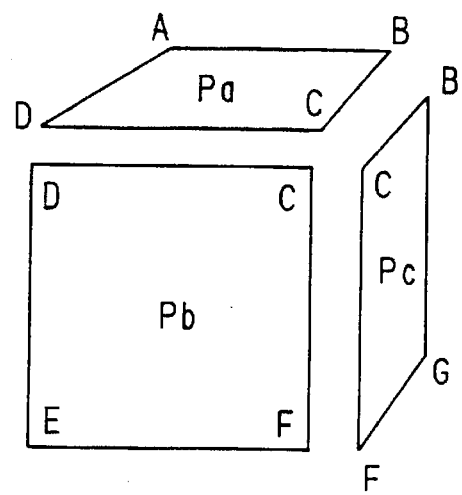
FIG.20 (PRIOR ART)
| IPa | |
|---|---|
| OD | |
| Ax | Ay |
| Bx | By |
| Dx | Dy |
| Cx | Cy |
| IPb | |
|---|---|
| OD | |
| Dx | Dy |
| Cx | Cy |
| Ex | Ey |
| Fx | Fy |
| IPc | |
|---|---|
| OD | |
| Bx | By |
| Cx | Cy |
| Gx | Gy |
| Fx | Fy | instruction 1 instruction 2 instruction 3

IMAGE GENERATING METHOD AND APPARATUS

BACKGROUND OF THE INVENTION

1. Field of the Invention

The present invention relates to a method and apparatus for generating an image based on image data that is transmitted in a compressed form or drawing data of computer graphics. In particular, the invention relates to an image generating method and apparatus suitable for use in cases where high visualization performance needs to be attained using limited hardware resources, for instance, in equipment utilizing computer graphics such as video game machines and graphic computers.

2. Description of the Related Art

In a system that is generally called a 3D (three-dimensional) graphic system in computer graphics, to draw an object (drawing object) with reality, i.e., to reconstruct an stereoscopic image, the object surface is decomposed into a plurality of polygons (i.e., smallest units (triangles and tetragons) of figures handled by a drawing device), and then the polygons are sequentially drawn on a frame memory (video RAM) that corresponds to the display screen of a monitor.

In this type of image generating apparatus, to enable fast processing, a dedicated drawing device is usually provided between a CPU and a frame memory. In generating an image, the CPU generates instructions (hereinafter called drawing instructions) for drawing fundamental figures such as triangles and tetragons (polygons) and sends those instructions to the drawing device rather than directly accesses the frame memory. The drawing device interprets the received instructions and draws an image on the frame memory.

FIGS. 19A and 19B illustrates a specific example of a drawing method. To display an object that is a rectangular parallelepiped having apices A–G as shown in FIG. 19A, first the object is decomposed into three tetragons, i.e., polygons Pa, Pb and Pc as shown in FIG. 19B.

Then, as shown in FIG. 20, the CPU generates drawing instructions IPa, IPb and IPc corresponding to the polygons Pa, Pb and Pc. Each of the drawing instructions IPa, IPb and IPc consists of apex coordinates (Ax, AF)-(Dx, Dy), (Cx, Cy)-(Fx, Fy) or (Bx, By)-(Gx, Gy) of the polygon Pa, Pb or Pc for determining display positions on the display screen and information OD indicating a color inside the polygon Pa, Pb or Pc.

The drawing device draws the object on the frame memory based on the above drawing instructions. The object is displayed at the display position designated by the drawing instructions by converting the drawing data of the frame memory to an analog signal and supplying it to a display device (monitor).

By the way, a common method of transferring drawing instructions to the drawing device is to employ DMA (direct memory access) to enable fast transfer.

However, in this type of conventional image generating apparatus, only part of data that are stored in the frame memory, such as drawing instructions and image data, are DMA-transferred. For example, control instructions that are necessary before drawing, such as instructions for clearing the screen and changing resolution, cannot be DMA-transferred but are transferred independently of drawing instructions. Therefore, the drawing device needs to have separate and independent receiving sections for drawing instructions and control instructions.

Further, separate transfer of drawing instructions and control instructions requires complex processing. For example, to change resolution after drawing a certain object, the conventional scheme needs the following complex processing. The CPU waits for drawing completion while always monitoring the operation of drawing the object. Upon detecting the completion of drawing the object, the CPU Stops DMA transfer of drawing data, changes resolution, and then restarts the DMA transfer of drawing data.

To simplify the structures of the drawing device and a DMA controller as a transfer device that are used for the above type of DMA transfer, one approach is to make the DMA transfer data such as drawing instructions have form of a fixed-length packet (transfer unit). In this case, the packet should not be shorter than the maximum length of the DMA transfer data such as drawing instructions. However, if drawing instructions that are shorter than the packet are frequently used, there occur many inefficient transfer operations.

For example, where DAM transfer instruction data have various data lengths (hatched in FIGS. 21A–21C) like instructions 1–3, the packet length is made equal to the maximum data length as shown in FIGS. 21A–21C. An empty portion of instruction data that is shorter than the packet is filled with an inoperative code NOP, for instance. FIG. 22 shows transfer and drawing processing times in such a case. It is understood that transfer times of inoperative codes NOP are consumed in vain.

In view of the above, a first object of the present invention is to allow control data to be transferred together with drawing data. A second object of the invention is to enable DMA transfer of data whose data lengths are not fixed.

U.S. Pat. No. 5,133,025 relates to the DMA of the invention. Further, Japanese Patent Application Nos. Hei. 5-190764 (filed Jul. 2, 1993), Hei. 5-258625 (filed Oct. 15, 1993) and Hei. 6-27405 (filed Jan. 31, 1994) relate to the drawing device of the invention. Each of these Japanese applications was filed by the present assignee and is hereby incorporated by reference. U.S. patent applications corresponding to these three Japanese applications are now pending.

SUMMARY OF THE INVENTION

To solve the above problems, according to the invention, an image generating method of transferring drawing instructions and control instructions generated by a CPU to a drawing device section, and generating an image in the drawing device section by sequentially performing drawing operations in accordance with the drawing instructions and the control instructions, comprises the steps of:

constructing the drawing instructions and the control instructions so that they have a data structure that includes a header portion and an instruction data portion, the header portion having a command identification code for indicating a kind of the instruction; and forming a drawing instruction sequence in which the drawing instructions and the control instructions are arranged in an order of drawing and control procedures, and transferring the drawing instruction sequence to the drawing device section without inclusion of the CPU.

Further, according to the invention, an image generating apparatus comprises (reference numerals of the later-described embodiment are used):

a memory 43 for storing drawing instructions and control instructions;

a CPU 42 for generating the drawing instructions and the control instructions so that they have a data structure that includes a header portion and an instruction data portion, the header portion having a command identification code for indicating a kind of the instruction, and for generating on the memory 43 a drawing instruction sequence in which the drawing instructions and the control instructions are arranged in an order of drawing and control procedures;

a drawing device section 61 for performing drawing operations on a frame memory 63 in accordance with the drawing instructions and the control instructions; and transfer means 45 for reading the drawing instruction sequence from the memory 43, and transferring it to the drawing device section without inclusion of the CPU.

Further, according to the invention, drawing instructions are constructed so that they have a data structure that includes a header portion and an instruction data portion, the header portion having a command identification code for indicating a kind of the instruction, a data length of an entire drawing instruction being variable; and the data length is judged from the command identification code, and the drawing instructions are transferred to the drawing device section with a transfer quantity that depends on the data length.

Control instructions may also be so constructed as to have the same data structure as the drawing instructions, and the drawing instructions and the control instructions may be transferred to the drawing device section in a mixed manner.

In the above constitution, drawing instructions and control instructions have the same data structure, and a drawing instruction sequence in which the drawing instructions and the control instructions are arranged in the order of drawing and control procedures is transferred to the drawing device section. The drawing device section sequentially executes the drawing instructions and the control instruction in the order of their arrangement in the drawing instruction sequence.

As a result, since the control instruction for drawing can be transferred in the same manner as the drawing instructions, not only the configuration of the drawing device section but also the transfer and execution are simplified. Therefore, the processing speed can be increased and the realtime performance can be improved.

Since a drawing sequence including control operations can be managed in a unified manner, the timing control of control operations in the execution processing of the drawing device section can be performed easily, which contributes to improving the processing efficiency. Further, as in the case of DMA transfer, a drawing instruction sequence can be transferred at high speed during time intervals when the CPU frees the system bus.

Since the entire drawing instruction sequence is retained on the main memory, the CPU can directly control it any time and, therefore, control can be performed immediately in response to an external input through a control pad etc. Therefore, the response speed of display on the screen can be improved, to enable a game machine that is superior in realtime performance to be realized easily.

Where an address value on the main memory of an instruction to be executed next is incorporated in a drawing instruction or a control instruction, when the drawing order is changed, it is sufficient to rearrange address values within drawing instructions; that is, it is not necessary to rearrange the drawing instructions themselves in the main memory so that they are located at changed addresses. Therefore, the load of the system bus can be reduced as much.

Since the drawing device section separately has a control port that receives a control instruction from the CPU directly with priority, the CPU can control the drawing device section so as to interrupt its drawing or display operation.

Since the data length of each instruction can be recognized from the command identification data, the transfer packet length of an instruction can be made variable depending on the data length of each instruction. As a result, the processing time can be shortened by eliminating unnecessary times.

BRIEF DESCRIPTION OF THE DRAWINGS

FIG. 3 shows an example of an instruction data structure in the embodiment of the invention;

FIGS. 4A–4D show examples of a drawing instruction and control instructions;

FIGS. 8 and 9 are a block diagram of the main part and a time chart for explaining transfer of the drawing instruction sequence in the embodiment of the invention;

FIG. 10 illustrates a processing time in the embodiment of the invention;

FIGS. 12A, 12B and 13 illustrate a drawing instruction setting processing of the CPU on a main memory and a drawing execution processing of a drawing device section in the embodiment of the invention, which are performed in a parallel manner;

FIG. 14 illustrates texture mapping;

FIG. 19A and 19B illustrates an example of a drawing method;

FIG. 20 shows conventional drawing instructions;

DESCRIPTION OF THE PREFERRED EMBODIMENT

Figure 1:
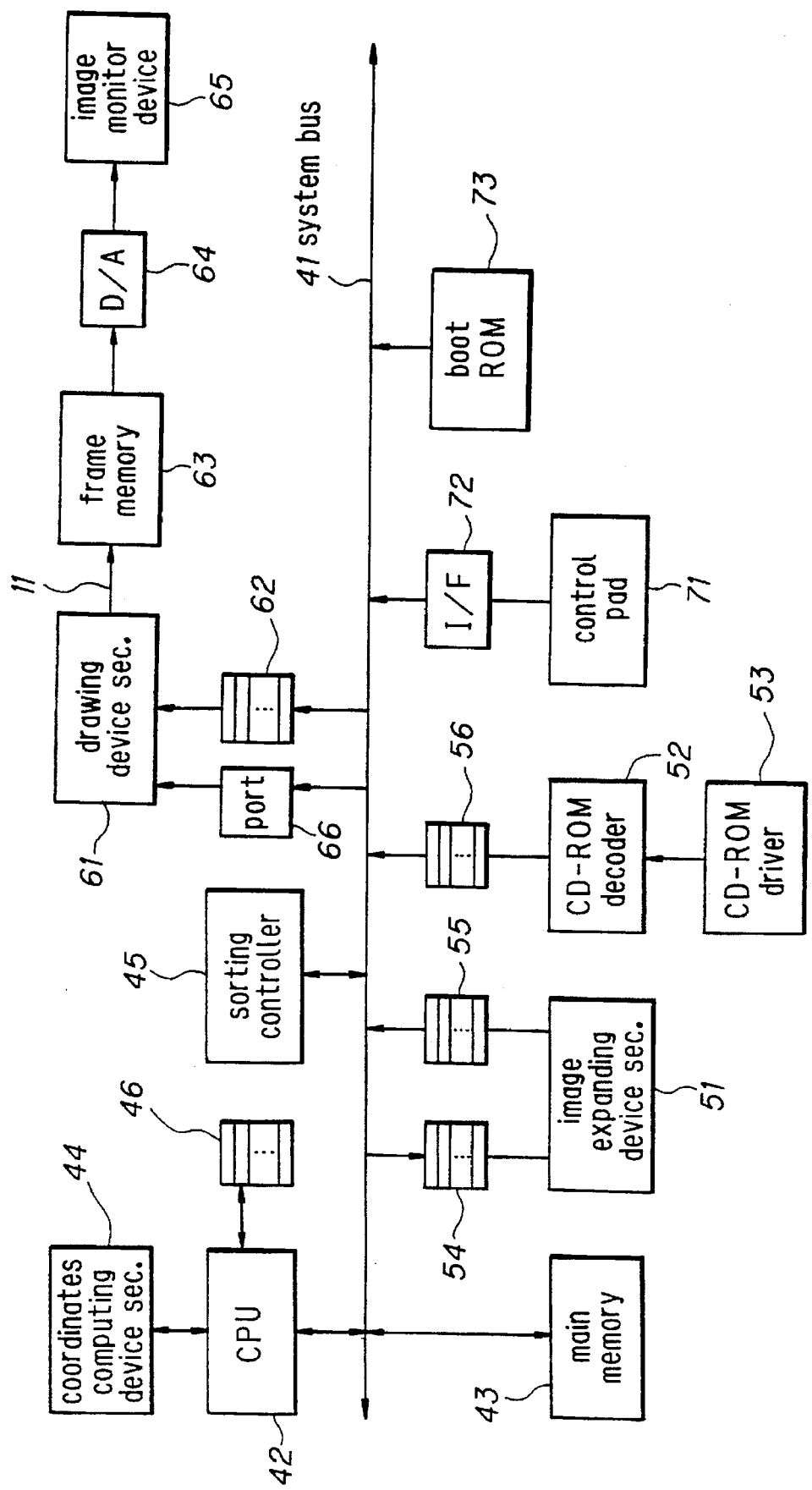
FIG. 1 is a block diagram showing an image generating apparatus according to an embodiment of the present invention.

An embodiment of the present invention will be hereinafter described with reference to the accompanying drawings. FIG. 1 shows a configuration of an image generating apparatus according to an embodiment of the invention. This embodiment is a game machine having a 3D graphic function and a moving picture reproducing function.

Referring to FIG. 1, reference numeral denotes a system bus (main bus), to which a CPU 42, a main memory 43 and a sorting controller 45 are connected.

Further, an image expanding device section 51 is connected to the system bus 41 via an input FIFO (first-in first-out) buffer memory 54 and an output FIFO buffer memory 55. A CD-ROM decoder 52 and a drawing device section 61 are also connected to the system bus 41 via a FIFO buffer 56 and a FIFO buffer 62, respectively.

Still further, a control pad 71 as an operation input means is connected to the system bus 41 via an Interface 72, and a boot ROM 73 that stores a program for building up the game machine is also connected to the system ROM 73.

The CD-ROM decoder 52 is connected to a CD-ROM driver 53, and decodes an application program (for instance, a game program) and data that are recorded on a CD-ROM disk incorporated in the CD-ROM driver 53. Moving picture or still picture image data which are image-compressed by, for instance, discrete cosine transform (DCT) and image data of texture images for decorating polygons are recorded on the CD-ROM disk. The application program on the CD-ROM includes polygon drawing instructions. The FIFO buffer 56 has a capacity corresponding to one sector of recorded data on the CD-ROM disk.

The CPU 42 manages the entire system. Further, the CPU 42 performs part of a process for drawing an object as a collection of many polygons. More specifically, the CPU 42 generates, on the main memory 43, not only drawing instructions but also control instructions (described later). Further, the CPU 42 generates, on the main memory 43, an instruction sequence that includes drawing instructions and control instructions in mixed form (described later).

Since the CPU 42 has a cache memory 46, part of CPU instructions can be executed without fetching those via the system bus 41. Further, the CPU 42 has, as a CPU internal coprocessor, a coordinates computing device section 44 for performing coordinates conversion computations for polygons and coordinates-related computations for control to generate drawing instructions and control instructions.

Incorporating the instruction cache 46 and the coordinates computing device section 44, the CPU 42 can perform its operations to some extent without Using the system bus 41, which makes it easier to free the system bus 42.

The image expanding device section 51, which expands compressed image data that is reproduced from the CD-ROM disk, has hardware including a Huffman code decoder, an inverse quantization circuit, and an inverse discrete cosine transform circuit. The function of the Huffman code decoder may be implemented as software that is executed by the CPU 42.

Figure 16:
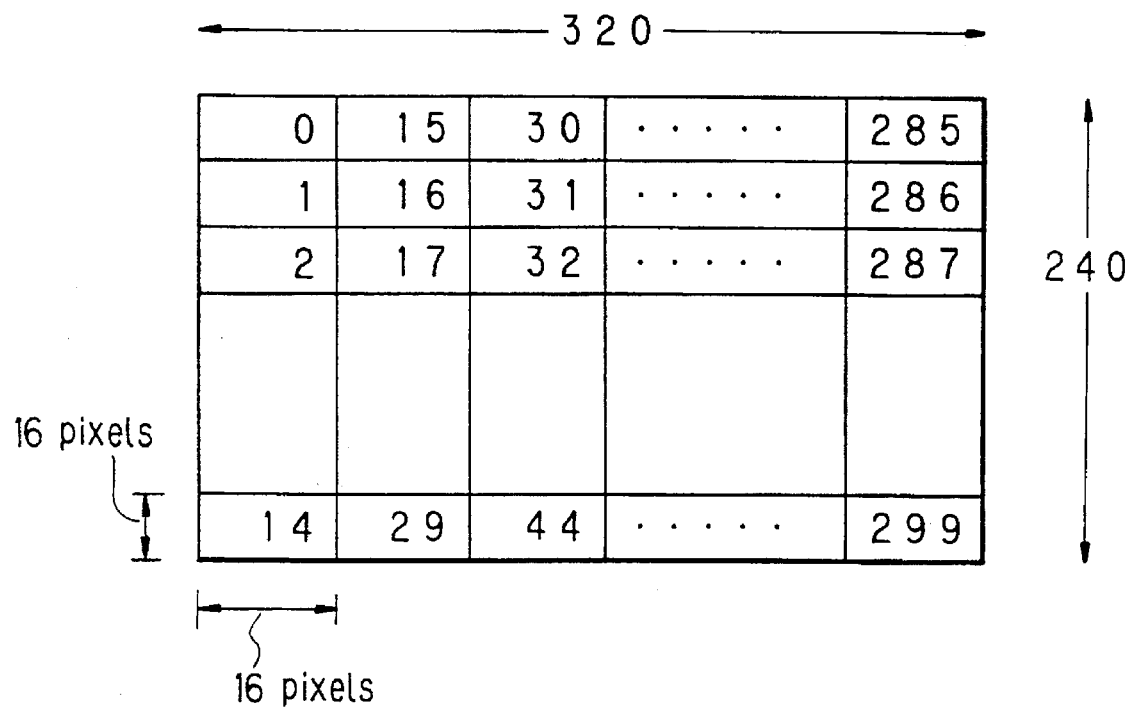
FIG. 16 shows an example of a one-frame image.

In this embodiment, the image expanding device section 51 divides an image of one frame into small blocks (hereinafter called macroblocks; later described in connection with FIG. 16) of, for instance, 16×16 pixels, and performs image expansion decoding on each macroblock. Since data transfer with the main memory 43 is performed on a macroblock basis, each of the FIFO buffers 54 and 55 has a capacity of one macroblock.

A frame memory 63 is connected to the drawing device section 61 via a local bus 11. The drawing device section 61 executes drawing instructions and control instructions that are included in a drawing instruction sequence transferred from the main memory 43 via the FIFO buffer 62, and writes execution results to the frame memory 63. The FIFO buffer 62 has a memory capacity of one instruction.

The drawing device section 61 receives direct control instructions from the CPU 42 via a control port 66, with priority, i.e., irrespective of reception of an instruction from the FIFO buffer 62. That is, the control operation of the drawing device section 61 is performed with priority given to operations corresponding to control instructions received from the control port 66, which means occurrences of interruptions. An example of such a control operation: When a displaying operation cannot keep up with a drawing operation in a realtime process, the CPU 42 generates a control instruction for resetting the drawing operation even in its midst, to forcibly display an intermediate drawing image.

The frame memory 63 has an image memory area for storing a drawing image, a texture memory area for storing texture images, and a table memory area for storing a color look-up table (color conversion table CLUT).

Figure 2:
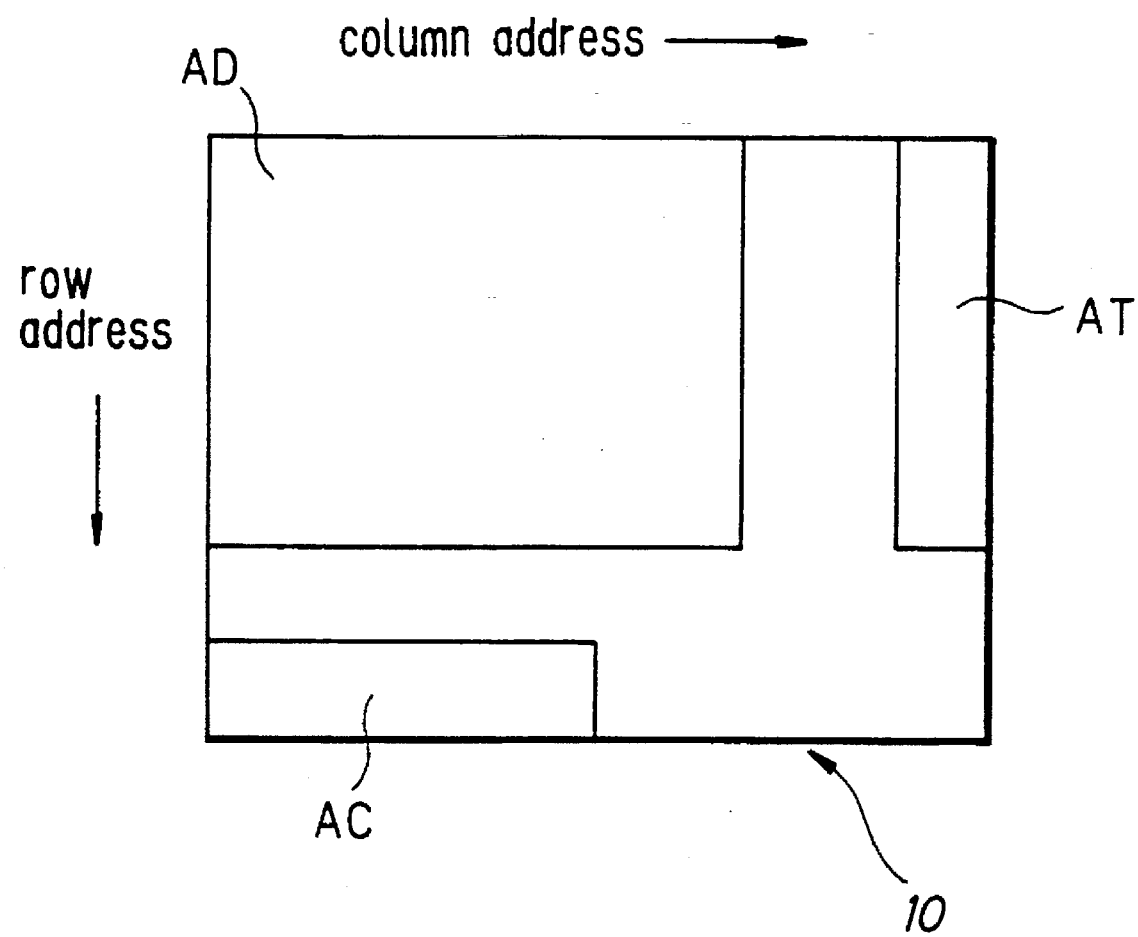
FIG. 2 illustrates memory areas in the embodiment of the invention.

FIG. 2 shows a memory space of the frame memory 63. The frame memory 63 can be addressed by a two-dimensional address consisting of a column address and a row address. An area AT of the two-dimensional address space is made the texture memory area. The texture area AT can store plural kinds of texture patterns. An area AC is the table memory area for storing the color conversion table CLUT.

As described later, data of the color conversion table CLUT is one that is transferred from the CD-ROM disk to the frame memory 63 via the CD-ROM decoder 52 under the control of the sorting controller 45. Data of texture images on the CD-ROM disk is expanded by the image expanding device section 51 and transferred to the frame memory 63 via the main memory 43.

In FIG. 2, an area AD is the image memory area, and has two frame buffer areas for display and drawing. In this embodiment, a frame buffer area for current display is called a display buffer and the other frame buffer area for current drawing is called a drawing buffer. While one frame buffer area serves as the drawing buffer for a drawing operation, the other frame buffer area is used as the display buffer. Upon completion of the drawing operation, the drawing buffer and the display buffer are switched in synchronism with a vertical sync signal.

Image data read from the display buffer of the frame memory 63 is supplied to an image monitor device 65 via a D/A converter 64 and displayed on its screen.

The sorting controller 45 has functions similar to those of what is called a DMA controller, and constitutes a transfer means. More specifically, the sorting controller performs image data transfer between the main memory 43 and the image expanding device section 51 and transfers a drawing instruction sequence from the main memory 43 to the drawing device section 61. The sorting controller 45 performs the above transfer operations without involvement of the CPU 42 while the system bus 41 is released by the other devices such as the CPU 42 and the control pad 71. To this end, the CPU 42 may inform the sorting controller 45 of release of the system bus 41. Alternatively, the sorting controller 45 may request the CPU 42 to release the system bus 41 (forcible release).

For moving picture or still picture image data, the main memory 43 has a memory area for compressed image data and a memory area for expanded image data (image data that has been subjected to expansion decoding). The main memory 43 further has a memory area (called packet buffers) for graphic data such as a drawing instruction sequence.

The packet buffers are used for setting of a drawing instruction sequence by the CPU 42 and transfer of a drawing instruction sequence to the drawing device section 61, and shared by the CPU 42 and the drawing device section 61. In this embodiment, to enable parallel processing of the CPU 42 and the drawing device section 61, there are provided two packet buffers: a packet buffer for setting a drawing instruction sequence (hereinafter called a setting packet buffer) and a packet buffer for transfer (hereinafter called an execution packet buffer). While one packet buffer serves as the setting packet buffer, the other is used as the execution packet buffer. Upon completion of an executing operation by use of the execution packet buffer, the functions of the two packet buffers are switched.

A detailed description will be made of the processing of the apparatus item by item.

Data Fetching from CD-ROM Disc

When the apparatus (game machine) of the FIG. 1 embodiment is powered on and the CD-ROM disk is loaded, a program of the boot-ROM 73 for what is called initialization that is necessary for execution of a game is executed by the CPU 42. Recorded data on the CD-ROM disk is then fetched. In this operation, respective user data are decoded based on identification information ID in the user data on the respective sectors of the CD-ROM disk, and data check is performed. Based on results of the data check, the CPU 42 performs processing in accordance with reproduction data of contents indicated by the respective identification information ID.

That is, compressed image data, drawing instructions and a program to be executed by the CPU 42 are read from the CD-ROM disk via the CD-ROM driver 53 and the CD-ROM decoder 52, and loaded into the main memory 43 by the sorting controller 45. Among the loaded data, the information of the color conversion table CLUT is transferred to the area AC of the frame memory 63.

Expansion and Transfer of Compressed Image Data

Among the data that have been input to the main memory 43, the compressed image data is subjected to a Huffman code decoding operation by the CPU 42, and then again written to the main memory 43 by the CPU 42. The sorting controller 45 transfers the image data that has been subjected to the Huffman code decoding operation from the main memory 43 to the image expanding device section 51 via the FIFO buffer 54. The image expanding device section 51 expansion-decodes the image data by performing inverse quantization and inverse DCT.

The sorting controller 45 transfers the expanded image data to the main memory 43 via the FIFO buffer 55. In the above operation, the image expanding device section 51 expands the image data on a macroblock basis. Therefore, the sorting controller 45 transfers compressed data of one macroblock from the main memory 43 to the input FIFO buffer 54. Upon completion of an expansion decoding operation on the one-macroblock image data, the image expanding device section 51 not only supplies resultant expanded image data to the output FIFO buffer 55, but also fetches the next one-macroblock compressed data from the input FIFO buffer 54 and expansion-decodes it.

If the system bus 41 is free and the output FIFO buffer 55 of the image expanding device section 51 is not empty, the sorting controller 45 transfers one-macroblock expanded image data to the main memory 43 and transfers the next one macroblock compressed image data from the main memory 43 to the input FIFO buffer 54 of the image expanding device section 51.

At a time point when prescribed macroblocks of expanded image data have been accumulated in the main memory 43, the CPU 42 transfers those expanded image data to the frame memory 63 via the drawing device section 61. When the expanded image data are transferred to the image data area AD of the frame memory 63, they are displayed, without any modification, on the image monitor device 65 as a background moving image. The expanded image data may be transferred to the texture memory area AT of the frame memory 63. The image data in the texture image area AT are used as a texture image for decorating polygons.

Processing and Transfer of Drawing Instruction Sequence

A stereoscopic image can be displayed on a two-dimensional image display screen by sequentially drawing polygons that constitute the surface of an object in the order of their depths (deeper polygons are drawn earlier) based on Z data that indicate their three-dimensional depths. The CPU 42 generates, on the main memory 43, a drawing instruction sequence so as to allow the drawing device section 61 to draw polygons in the above manner, i.e., in the order of their depths.

By the way, computer graphics employs What is called a Z buffer method in which a display priority order of polygons is determined using Z data that are stored in a memory for respective pixels. However, the Z buffer method requires a large-capacity memory to store the Z data.

To solve this problem, in this embodiment, a stereoscopic image is displayed on the two-dimensional image display screen by sequentially drawing (overwriting) polygons in the order of their depths. To this end, it is necessary that drawing instructions be sequentially transferred from the main memory 43 to the drawing device section 16 in accordance with the drawing order.

If DMA transfer from the main memory 43 to the drawing device section 61 is performed by a conventional DMA controller, there is needed a process of rearranging drawing instructions into an execution order on the main memory 43, i.e., changing storage addresses of drawing instructions. However, extra time needed for the rearranging makes it difficult to realize realtime processing.

In consideration of the above, in this embodiment, the CPU 42 is given an ability of determining a display priority order of polygon drawing without changing addresses of drawing instructions on the main memory 43 by employing the following data structure for drawing instructions.

In a drawing operation, a prescribed control instruction is usually executed before execution of a drawing instruction. For example, prior to a drawing operation, control instructions such as a clear instruction for erasing image data of the frame memory 63, a resolution changing instruction for changing the numbers of pixels in the horizontal and vertical directions, and an offset changing instruction for controlling an offset of a starting position of image drawing from the origin are executed.

In this embodiment, a control instruction has the same data structure as a drawing instruction. Control instructions are inserted before prescribed drawing instructions to construct a drawing instruction sequence so that the control instructions are transferred together with the drawing instructions. The drawing device section 61 can perform desired drawing operations by performing control and drawing in accordance with the drawing instruction sequence.

FIG. 3 schematically shows an example of an instruction data structure in this embodiment. The data structure consists of a header portion and an instruction data portion.

The header portion consists of a tag TG and a command identification code CODE. An address on the main memory 43 at which the next drawing instruction or control instruction is stored is written to the tag TG. The command identification code CODE includes identification data IDP that indicates what the instruction is and, if necessary, other information that is necessary for the instruction.

Coordinate values and other parameters are written to the instruction data portion. Parameters of the instruction data portion are determined for each instruction. Although the data length of the instruction data portion varies from one instruction to another, it is fixed for each instruction because parameters are determined for each instruction.

FIG. 4A shows an example of a polygon drawing instruction. In this case, the identification data IDP of the command identification code CODE indicates that the instruction is a polygon drawing instruction. Where the polygon should be mapped with a single color, the command identification code CODE includes color data (R, G, B) of the three primary colors for mapping as other necessary information. The instruction of FIG. 4A is a tetragon drawing instruction, and its instruction data portion describes four coordinates (X0, Y0), (X1, Y1), (X2, Y2) and (X3, Y3).

FIG. 4B shows an example of a clear control instruction. In this case, the identification data IDP of the command identification code CODE indicates that the instruction is a clear control instruction. The instruction data portion describes coordinates (Xs, Ys) of the top-left corner and coordinates (Xe, Ye) of the bottom-right corner of a rectangular region to be cleared.

Figure 5:
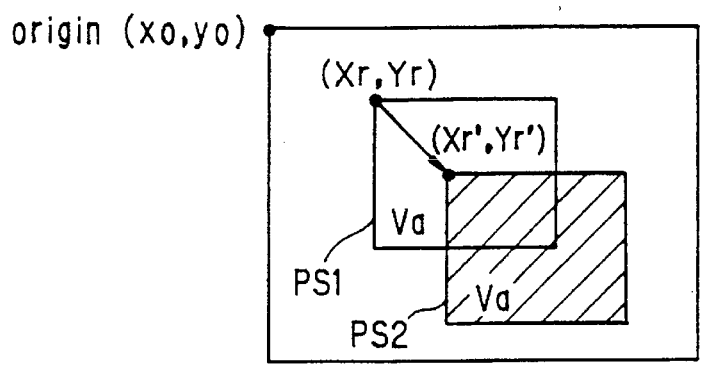
FIG. 5 illustrates an operation effected by an offset control instruction that is an example of a control instruction.

FIG. 4C shows an example of an offset control instruction. In this case, the identification data IDP of the command identification code CODE indicates that the instruction is an offset control instruction. For example, in drawing a rectangular image Va and displaying it on the screen, this offset control instruction controls the display position of the rectangular image Va by giving coordinates (xr, yr) of its top-left corner as offset values with respect to the origin coordinates (xo, yo) of the screen (see FIG. 5). By using the offset control instruction, the display position of the rectangular image Va can be controlled without specifying position coordinates of its four corners. It is convenient to use an offset control instruction to change the position of the rectangular image Va from PS1 to PS2 as shown in FIG. 5.

FIG. 4D shows an example of a resolution control instruction. The identification data IDP of the command identification code CODE indicates that the instruction is a resolution control instruction. The instruction data portion specifies the number of pixels in the horizontal and vertical directions. In the example of FIG. 4D, the number of pixels in the horizontal direction is 320 and the number of pixels (lines) in the vertical direction is 240.

As is understood from the above, the instruction data portions of drawing instructions and control instructions have different lengths. In some cases, the command identification codes CODE have different data lengths. Thus, as a whole, the data lengths of the instructions are not fixed. However, since each instruction has a fixed data length, the total data length of a certain instruction can be recognized by determining what the instruction is from the identification data IDP of the command identification code CODE. Therefore, in this embodiment, lengths of packets (transfer unit) are not fixed, but transferred with variable lengths depending on data lengths of respective instructions.

In response to a user's operation input through the control pad 71, the CPU 42 calculates movements of an object and a viewing point and generates drawing instructions and control instructions on the main memory 43. The CPU 42 then rewrites the tags TG of the drawing instructions and control instructions into an order corresponding to the drawing order and the control order, and generates a drawing instruction sequence on the main memory 43. That is, the CPU 42 rewrites the addresses of the tags TG so that a control instruction is placed before a series of drawing instructions to be controlled, and that the drawing instructions are rearranged into the drawing order. In this operation, only the addresses of the tags TG are written and the addresses of the respective instructions on the main memory 43 are not changed.

Figure 6:
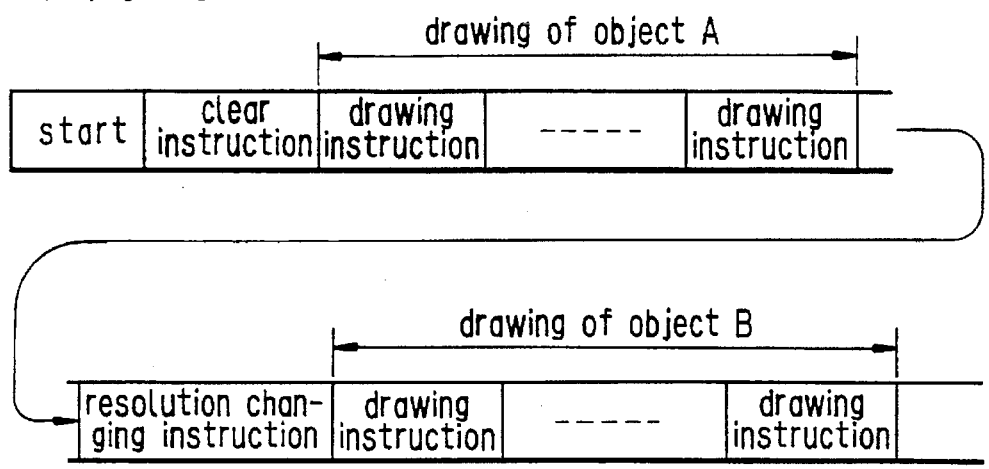
FIG. 6 illustrates an example of a drawing instruction sequence.

For example, in the case of a drawing instruction sequence in which after the drawing buffer of the frame memory 63 is cleared, object A is drawn and then object B is drawn with change of resolution. As shown in FIG. 6, a start address is so set that a clear control instruction is placed at the head of the sequence. Then, the tag TG of the clear control instruction is so set as to designate an address on the main memory 43 of the first drawing instruction for object A. Then, the tags TG of respective drawing instructions for object A are so set as to conform to the order of drawing it.

Subsequently, the tag TG of the last drawing instruction for object A is so set as to designate an address on the main memory 43 of a resolution changing control instruction. Then, the tag TG of the resolution changing control instruction is so set as to designate an address on the main memory 43 of the first drawing instruction for object B.

Figure 7:
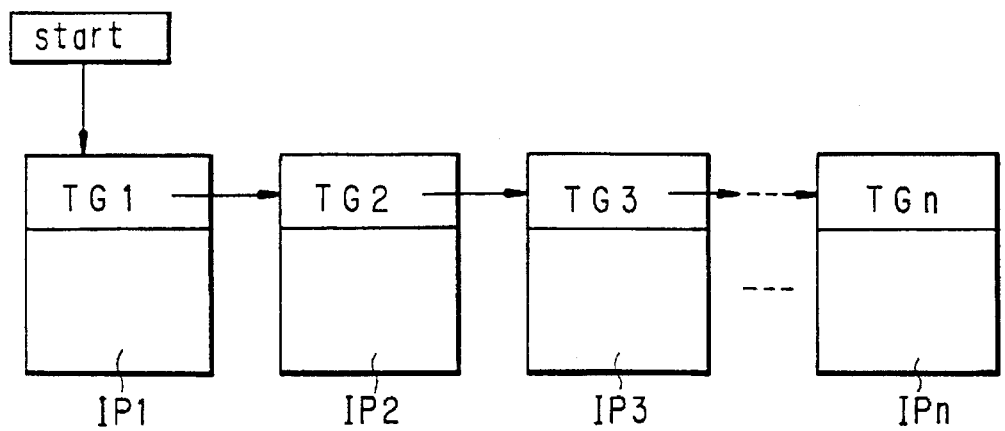
FIG. 7 illustrates an order of drawing and displaying a polygon in the embodiment of the invention.

Upon completion of the setting of the drawing instruction sequence, the sorting controller 45 transfers, one by one, the control instructions and the drawing instructions IP1, IP2, IP3 . . . , IPn from the main memory 43 to the drawing device section 61 in the order indicated by the tags TG1, TG2, TG3 . . . , TGn (see FIG. 7). Therefore, it is sufficient for the FIFO buffer 62 to have a capacity of one instruction.

Since the transferred data are already in a sorted state, the drawing device section 61 need not rearrange the instructions IP1, Ip2, IP3 . . . , IPn in contrast to the case of the Z buffer method. That is, the drawing device section 61 sequentially executes those instruction in the order of their arrival and stores execution results into the drawing area AD of the frame memory 63.

FIG. 8 is a block diagram for explaining a control operation of transferring the drawing instruction sequence from the main memory 43 to the drawing device section 61. FIG. 9 shows principal timing signals used in the portion of the apparatus shown in FIG. 8.

Referring to FIG. 8, when the FIFO buffer 62 becomes empty, the drawing device section 61 generates a transfer request DREQ (see part A of FIG. 9). In response to the transfer request DREQ, the sorting controller 45 transfers the next instruction of the drawing instruction sequence at a timing when the system bus 41 is freed by the CPU 42.

Before transferring the instruction, the sorting controller 45 judges, based on the identification data IDP, the data length of the instruction to be transferred from the main memory 43. Based on a judgment result, the sorting controller 45 generates a signal DACK of, for instance, a high level (see part B of FIG. 9) during a period corresponding to the transfer data length, and transfers it to the drawing device section 61. At the same time, the sorting controller 45 transfers a transfer clock WR (see part C of FIG. 9) to the drawing device section 61 and, in synchronism with the transfer clock WR, transfers transfer data DATA (see part D of FIG. 9) to the FIFO buffer 62 of the drawing device section 61.

While the signal DACK is at a high level, the drawing device section 61 recognizes that the sorting controller 45 is transferring the transfer data DATA, i.e., one drawing instruction or control instruction. Therefore, even if a drawing instruction or control instruction being transferred has a variable data length, the drawing device section 61 can recognize its data length based on the signal DACK, and can perform the drawing or control immediately after completion of the instruction transfer.

That is, when the signal DACK falls to a low level, the drawing device section 61 recognizes completion of the instruction transfer to the FIFO buffer 62. Thus, upon completion of the preceding drawing or control, the drawing device section 61 fetches the instruction from the FIFO buffer 62 and performs the drawing or control.

Figure 21A:
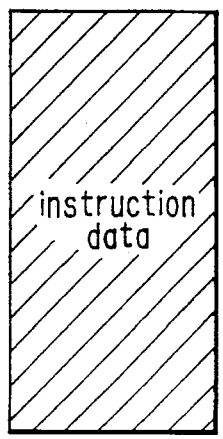
FIG. 21 illustrates an example of a conventional data structure for transfer of drawing instructions.
Figure 21B:
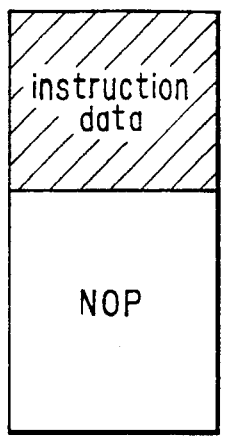
Figure 21C:
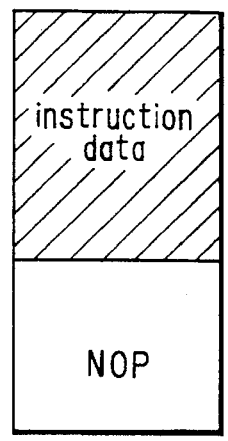
Figure 22:
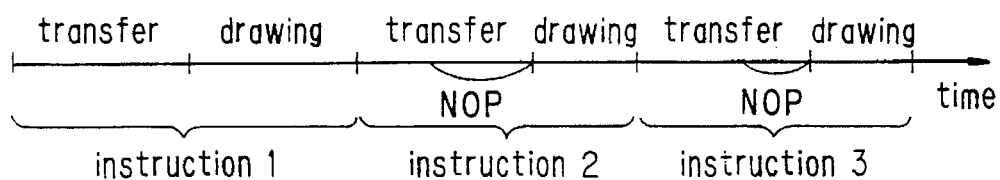
FIG. 22 illustrates an example of a conventional processing time.

As described above, in the apparatus of FIG. 1, one instruction is transferred in accordance with its data length, and the drawing or control can be performed immediately after completion of the transfer (see FIG. 10). Since there is no need of inserting inoperative data COP in transfer packets as in the conventional case of FIGS. 21 and 22, the processing time is shortened as much.

Figure 11:
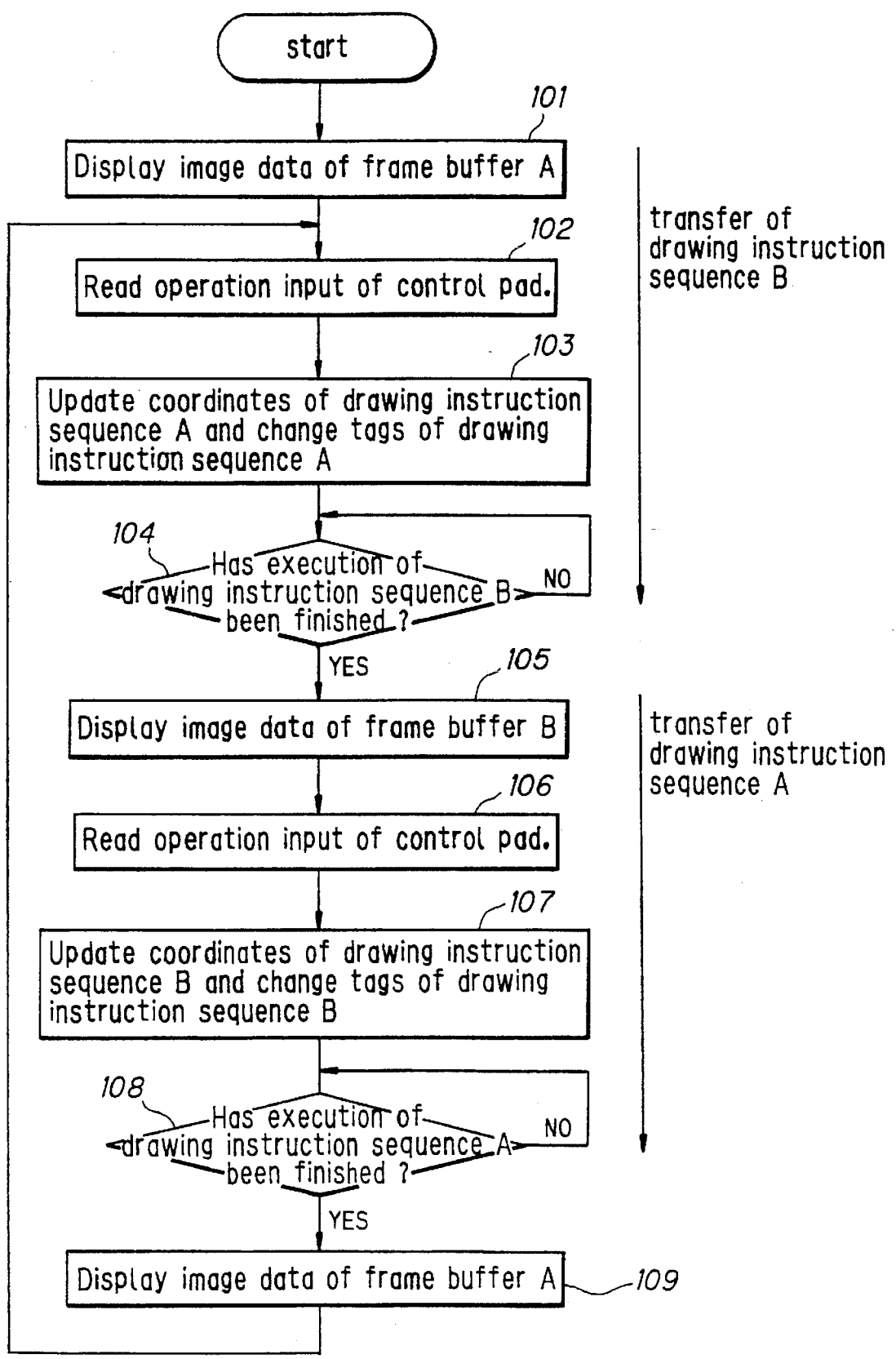
FIG. 11 is a flowchart showing operations performed by a CPU in a drawing process in the embodiment of the invention.

Referring to a flowchart of FIG. 11, a description will be made of operations performed by the CPU 42 when the drawing instruction sequence is transferred and its instructions are executed.

First, in step 101, the CPU 42 sends an instruction to the drawing device section 61 to cause it to supply the image monitor device 65 with image data stored in one of the frame buffer areas, i.e., frame buffer area A (now serving as the display buffer) of the image memory area AD of the frame buffer 63. In step 102, the CPU 42 reads an operation input of the control pad 71. In step 103, in accordance with the operation input, the CPU 42 updates coordinate values etc. of the drawing instructions and control instructions of drawing instruction sequence A stored in one of the packet buffers (now serving as the setting packet buffer) of the main memory 43, and rewrites the tags TG of the respective instructions of drawing instruction sequence A so that they conform to the drawing order and the control order.

While steps 101–103 are executed, drawing instruction sequence B stored in the other packet buffer (serving as the execution buffer) of the main memory 43 is transferred to the drawing device section 61 by the sorting controller 45, and the drawing device section 61 performs, on a realtime basis, the drawing and control of drawing instruction sequence B with the use of the other frame buffer area B (serving as the drawing buffer) of the image memory area AD of the frame memory 63.

Then, in step 104, the CPU 42 waits for completion of the drawing and control of drawing instruction sequence B. That is, the CPU 42 judges whether all of drawing instruction sequence B has been transferred from the main memory 43 and the drawing and control have been finished.

Upon completion of the execution of drawing instruction sequence B, the CPU 42 makes the frame buffer area B of the frame memory 63 the display buffer, and sends an instruction to the drawing device section 61 to cause it to read drawing image data from the frame buffer area B and supply that data to the image monitor device 65 (step 105). At the same time, the frame buffer area A of the frame memory 63 is switched to the drawing buffer.

In step 106, the CPU 42 reads an operation input of the control pad 71. In step 107, in accordance with the operation input, the CPU 42 updates coordinate values, control instruction data, etc. of drawing instruction sequence B stored in the other packet buffers (serving as the setting packet buffer) of the main memory 43, and rewrites the tags TG of the respective instructions of drawing instruction sequence B so that they conform to the drawing order and the control order.

While steps 105–107 are executed, drawing instruction sequence A stored in the one packet buffer (serving as the execution buffer) of the main memory 43 is transferred to the drawing device section 61 by the sorting controller 45, and the drawing device section 81 performs, on a realtime basis, the drawing and control of drawing instruction sequence A with the use of the one frame buffer area A (serving as the drawing buffer) of the image memory area AD of the frame memory 63, Then, in step 108, the CPU 42 waits for completion of the drawing and control of drawing instruction sequence A. That is, the CPU 42 judges whether all of drawing instruction sequence A has been transferred from the main memory 43 and the drawing and control have been finished.

Upon completion of the execution of drawing instruction sequence A, the CPU 42 makes the frame buffer area A of the frame memory 63 the display buffer, and sends an instruction to the drawing device section 61 to cause it to read drawing image data from the frame buffer area A and supply that data to the image monitor device 65 (step 109). At the same time, the frame buffer area B is switched to the drawing buffer. Then, the CPU 42 returns to step 102 to repeat the above process. A moving picture can be displayed by repeating the above process 30–60 times per second.

As is apparent from the above description, the CPU 42 and the drawing device section 61 operate in a parallel manner. More specifically, the CPU 42 sequentially rewrites address values of the tags TG of respective instructions of a drawing instruction sequence stored in the setting packet buffer of the main memory 43 to address values of the main memory 43 where the next instructions are stored (shown by arrows in FIG. 12B). At the same time, the sorting controller 45 reads the drawing instruction sequence from the execution packet buffer of the main memory 43 by tracing the tags TG of the respective instructions (shown by arrows in FIG. 12A), and transfers it to the drawing device section 61, which performs a drawing operation in accordance with the drawing instruction sequence.

As shown in FIG. 13, while the CPU generates a drawing instruction sequence, the drawing device section 61 is in a state of performing a drawing operation based on a previously generated drawing instruction sequence. After completion of the drawing execution, a drawing operation based on the drawing instruction sequence just generated.

To draw a polygon, data is sent to a gradient calculating unit of the drawing device section 61, which performs a gradient calculation. The gradient calculation is to determine the gradient of a plane of mapping data when the inside of the polygon is filled with the mapping data in the polygon drawing operation. In the case of using textures, a polygon is filled with texture image data. In the case of glow shading, a polygon is filled with luminance values.

To attach textures to polygons that constitute the surface of an object, texture data of the texture area AT are subjected to two-dimensional mapping transform. For example, texture patterns T1–T3 shown in part A of FIG. 14 are converted to coordinates on a two-dimensional screen so as to conform to polygons of respective faces of an object shown in part B of FIG. 14. The texture patterns T1–T3 that have been subjected to such mapping transform are attached to the faces of the object OB1 as shown in part C of FIG. 14. Resultant data are arranged in the image memory area AD and displayed on the display screen of the image display monitor 65.

In the case of still picture textures, texture patterns on the main memory 43 are transferred to the texture area AT of the frame memory 63 via the drawing device section 61, which attach the texture patterns to polygons. Still picture textures are applied to an object in this manner. Data of still picture texture patterns can be recorded on a CD-ROM disk.

Further, moving picture texture application is also possible. In the case of moving picture textures, compressed moving picture data from the CD-ROM disk is temporarily written to the main memory 43, and the compressed image data is then sent to the image expanding device section 51, which expands the image data.

The expanded moving picture data is sent to the texture area AT of the frame memory 63. Since the texture area AT is provided in the frame memory 63, the texture patterns can also be rewritten frame by frame. While moving picture data is sent to the texture area AT in this manner, textures vary being dynamically rewritten frame by frame. Moving picture texture application can be realized by performing texture mapping on polygons using moving picture data of the texture area AT.

As described above, background moving pictures can be displayed on the screen of the image monitor device 65 by sending image data that has been expanded by the image expanding device section 51 to the image memory area AD of the frame memory 63. It is possible to draw images on the screen of the image display monitor 65 based only on drawing images that are generated by drawing instructions generated by the CPU 42 and that fill the image memory area AD. It is also possible to draw, on the image memory area AD, drawing data of an object generated by polygon drawing of the CPU 42 on still picture data obtained by expanding image data from the CD-ROM disk.

As described above, the sorting controller 45 transfers, without inclusion of the CPU 42, drawing instructions and image data during time intervals when the system bus 41 is free.

To transfer image data expansion-decoded by the image expanding device section 51 from the main memory 43 to the frame memory 63, the following expanded data transfer instruction is used in this embodiment. This type of conversion of expanded image data to a transfer instruction format is performed by the CPU 42.

Figure 15:
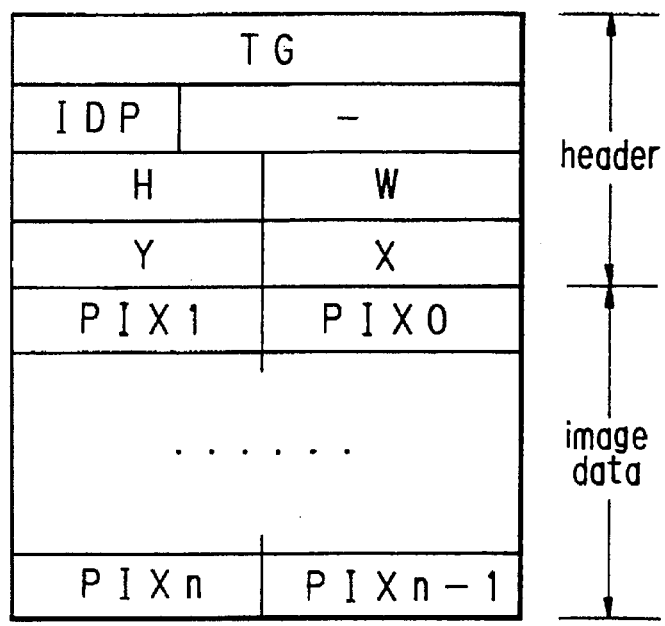
FIG. 15 shows an example of a data structure that is employed in transferring image data in the embodiment of the invention.

FIG. 15 shows a structure of the expanded data transfer instruction mentioned above. Having approximately the same data structure as a drawing instruction and a control instruction, the expanded data transfer instruction consists of a header portion and an image data portion. In the header portion, a tag TG is placed at the head and an identification data IDP is placed next thereto. As in the case other instructions, the tag TG contains an address value of the main memory 43 where the next drawing instruction, control instruction or transfer instruction is stored. Data indicating that the instruction is an expanded image data transfer instruction is described in the identification data IDP.

The image data portion, that follows the header portion, includes expanded image data PIX0, PIX1, PIX2 . . . , PIXn.

The sorting controller 45 transfers expanded image data from the main memory 43 to the drawing device section 61 in units of the above transfer instruction.

In FIG. 15, data "H" and "W" of the header portion indicate a height and a width of a region of expanded data to be transferred, and correspond to a region in a one-frame picture. Data "X" and "Y" indicate coordinates of a transfer destination. Since the transfer region is a rectangle, these coordinates indicate the top-left corner of the rectangular region. These coordinates are coordinates in the image memory area AD of the frame memory 63 if the transfer destination is located in the area AD, and are coordinates in the texture area AT if the transfer destination is located in the area AT.

In the case of the expanded image data transfer instruction, the items from the tag TG to the coordinates X and Y constitute the head portion. The size of the header portion is recognized from the identification data IDP. The data length of the image data portion is recognized from the height H and the width W. The total data length of the expanded data transfer instruction is recognized as a sum of the above size and data length. The items from the identification data IDP to the coordinates X and Y correspond to the command identification code CODE of a drawing instruction shown in FIG. 3.

By the way, as described above, the image expanding device section 51 divides a one-frame image into macroblocks each consisting of 16×16 pixels (horizontally and vertically), and performs expansion decoding on a macroblock basis. For example, if an image is assumed in which one frame consists of 320×240 pixels (horizontally and vertically), one frame is divided into 300 macroblocks as shown in FIG. 16.

Figure 17:
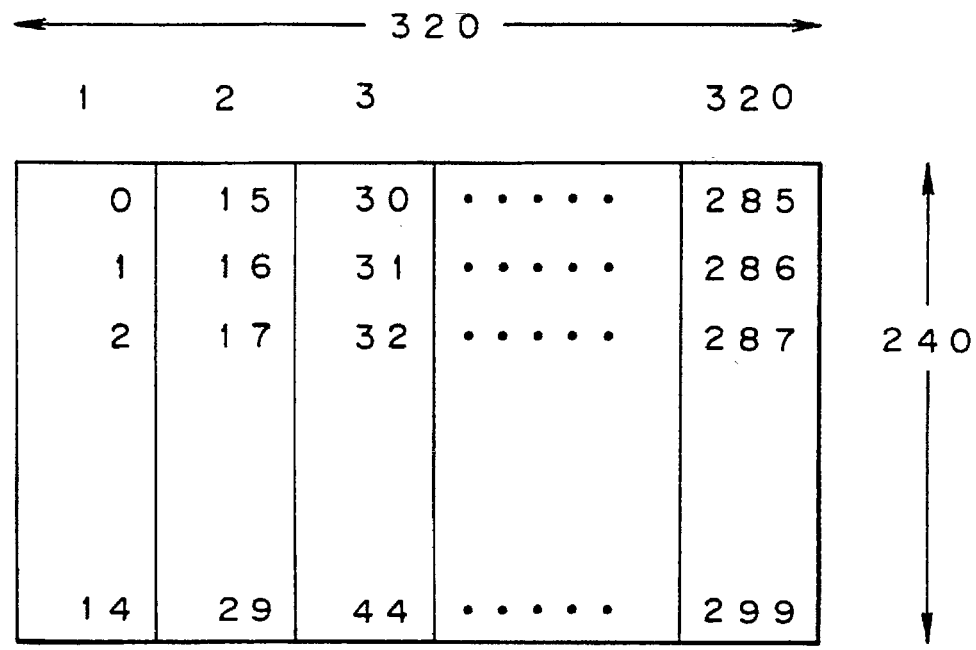
FIG. 17 illustrates a transfer unit of image data in the embodiment of the invention.

To transfer 300 macroblocks to the drawing device section 61, the overhead of the header portion is too large if transfer instructions are generated for the respective macroblocks. Therefore, in this embodiment, as shown in FIG. 17, a plurality of (15 in FIG. 17) macroblocks forming each vertical column are connected to each other and made a transfer unit of an expanded data transfer instruction.

Figure 18:
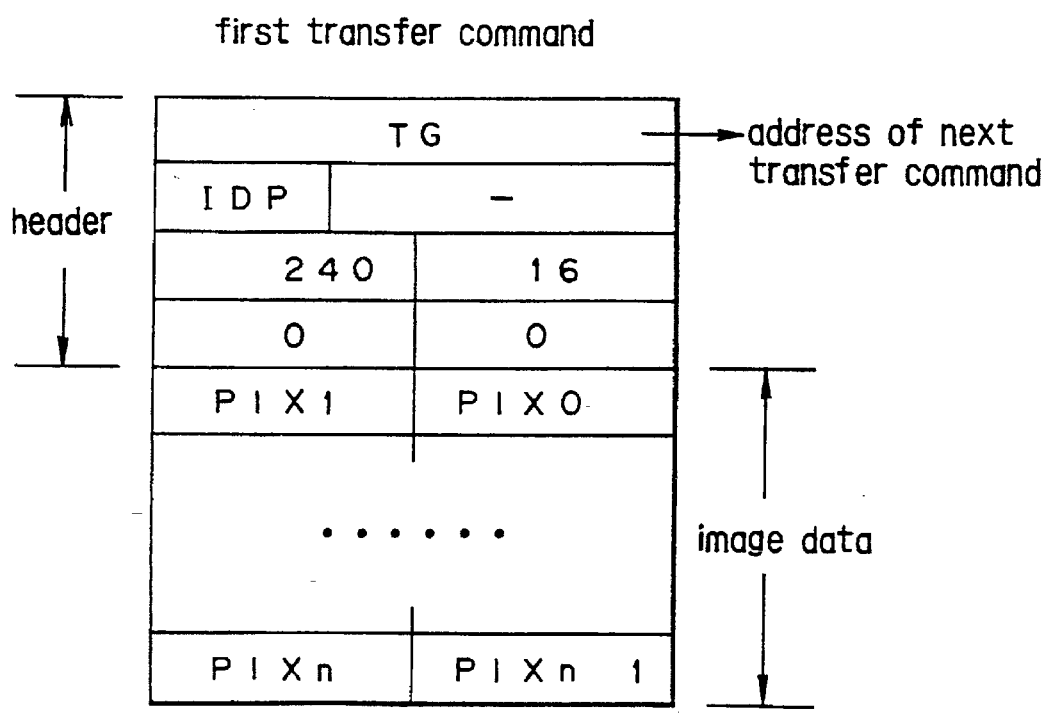
FIG. 18 shows an example of a data structure that is employed in transferring image data in the embodiment of the inventions.

FIG. 18 shows an example of the first expanded data transfer instruction of one frame. In FIG. 18, both coordinates X and Y are 0. In the next expanded data transfer instruction, the coordinates X and Y are 16 and 0, respectively.

As described above, because expanded image data is converted to the instruction format having the data structure similar to that of a drawing instruction and a control instruction, the transfer by the sorting controller 45 and the image drawing and generation on the frame memory by the drawing device section 61 can be performed such that polygon drawing instructions and control instructions and expanded data transfer instructions are mixed with each other, by utilizing the tags TG.

The following advantages are obtained by the apparatus according to the above embodiment. Since a drawing instruction sequence, compressed image data and expanded image data on the main memory 43 are transferred during time intervals when the CPU frees the system bus 41 without inclusion of the CPU 42, the system bus 41 can be used efficiently in a time-divisional manner.

Since the entire drawing instruction sequence is retained on the main memory 43, the CPU 42 can directly control it any time and, therefore, control can be performed immediately in response to an external input through the control pad 71 etc. This will contribute to improving response speed of display on the screen.

Similarly, since the entire moving picture data is temporarily retained by the main memory 43, the CPU can directly control the moving picture data at any time and, therefore, control can be performed immediately in response to an external input through the control pad 71 etc. This will contribute to improving response speed of display on the screen.

Since control instructions and drawing instructions can be transferred together to perform drawing, the drawing device section 61 is not required to have hardware for receiving those two kinds of instructions separately. Therefore, not only its configuration but also the transfer and drawing operations are simplified.

Since the drawing device section 61 separately has the control port 66 that receives a control instruction from the CPU 42 directly with priority, the CPU 42 can control the drawing device section 61 so as to interrupt its drawing or display operation.

Since the data length of each instruction can be recognized from the command identification data IDP, the transfer packet length of an instruction can be made variable depending on the data length of each instruction. As a result, the processing time can be shortened by eliminating unnecessary times.

Since the number of stages of the FIFO buffer 62 that is associated with the drawing device section 61 can be only a number corresponding to one drawing instruction, the circuit scale of the drawing device section 61 can be reduced.

Since the image expanding device section 51 uses the main memory 43 as a buffer, it need not have a local memory. Further, the number of stages of each of the FIFO buffers 54 and 55 that are associated with the image expanding device section 51 can be only a number corresponding to one macroblock, the circuit scale of the drawing device section 61 can be reduced.

An address value on the main memory 43 of a drawing instruction to be executed next is incorporated in a drawing instruction. Therefore, when the drawing order is changed, it is sufficient to rearrange address values within drawing instructions; that is, it is not necessary to rearrange the drawing instructions themselves in the main memory 43 so that they are located at changed addresses. Therefore, the load of the system bus 41 can be reduced as much.

In general, in generating continuously moving images, it is rare that contents of a drawing instruction sequence that is developed on the main memory 43 greatly vary between adjacent frames. Therefore, it is rarely required to change address values; that is, in practice, it is sufficient in many cases to simply change coordinate values of a drawing instruction sequence of the preceding frame.

Although in the above embodiment image data and an application program are recorded on the CD-ROM disk, other recording media including a magnetic disk and a semiconductor memory such as a memory card may also be used.

Although in the above embodiment DCT is used as the image data compression method, other various image data compression methods may also be used.

What is claimed is:

1. A method of transferring drawing instructions and control instructions generated by a CPU to a drawing device section, and generating an image in the drawing device section by sequentially performing drawing operations in accordance with the drawing instructions and the control instructions, comprising the steps of:

constructing the drawing instructions and the control instructions having a common data structure that includes a header portion and an instruction data portion, the header portion having a command identification code for identifying respective drawing and control instructions; and forming a drawing instruction sequence in which the drawing instructions and the control instructions are arranged in an order of drawing and control procedures, and transferring the drawing instruction sequence to the drawing device section.

2. An image generating apparatus, comprising:

a main memory for storing drawing instructions and control instructions:

a CPU for generating the drawing instructions and the control instructions having a common data structure that includes a header portion and an instruction data portion, the header portion having a command identification code for identifying respective drawing and control instructions, and for generating on the main memory a drawing instruction sequence in which the drawing instructions and the control instructions are arranged in an order of drawing and control procedures;

a drawing device section for performing drawing operations on a frame memory in accordance with the drawing instructions and the control instructions; and transfer means for reading the drawing instruction sequence from the main memory, and transferring it to the drawing device section.

3. The image generating apparatus according to claim 2, wherein the CPU, the main memory, and the drawing device section are connected to a system bus, and wherein the transfer means transfers, without inclusion of the CPU, the drawing instruction sequence from the main memory to the drawing device section during time intervals when the CPU and the other devices are not utilizing the system bus.

4. An image generating apparatus, comprising:

a main memory for storing drawing instructions and control instructions:

a CPU for generating the drawing instructions and the control instructions having a common data structure that includes a header portion and an instruction data portion, the header portion having a command identification code for identifying respective drawing and control instructions and an address on the main memory of an instruction to be executed next, and for generating a drawing instruction sequence on the main memory by setting addresses of the header portions of the drawing instructions and the control instructions on the main memory in which the drawing instructions and the control instructions are arranged in an order of drawing and control procedures;

a drawing device section for performing drawing operations on a frame memory in accordance with the drawing instructions and the control instructions; and transfer means for reading the drawing instructions and the control instructions from the main memory in accordance with the addresses of the header portions, and transferring the drawing instructions and the control instructions to the drawing device section as the drawing instruction sequence.

5. The image generating apparatus according to claim 4, further comprising operation input means, wherein the image generating apparatus has a configuration of a game machine in which the CPU generates the drawing instructions and control instructions and sets the order in the drawing instruction sequence in response to an operation input of the operation input means.

6. The image generating apparatus according to claim 5, wherein an entire data length of each of the drawing instructions and the control instructions is variable and wherein the transfer means determines the data length based on the command identification code, and transfers the drawings instructions and the control instructions to the drawing device section with a transfer quantity that depends on the data length.

7. The image generating apparatus according to claim 6, wherein the drawing device section comprises means for independently receiving a control instruction that is transferred from the CPU, in addition to means for receiving the control instructions that are included in the drawing instruction sequence transferred from the transfer means.

8. A method of transferring drawing instructions and control instructions generated by a CPU to a drawing device section, and generating an image in the drawing device section by sequentially performing drawing operations in accordance with the drawing instructions, comprising the steps of:

constructing the drawing instructions having a common data structure that includes a header portion and an instruction data portion, the header portion having a command identification code for identifying respective drawing and control instructions, a data length of an entire drawing instruction being variable; and determining the data length from the command identification code, and transferring the drawing instructions to the drawing device section with a transfer quantity that depends on the data length.

9. The method according to claim 8, wherein the drawing instructions and the control instructions are transferred to the drawing device section in a mixed manner.

* * * * *